(12) United States Patent
Bai et al.

(10) Patent No.: US 11,599,825 B2
(45) Date of Patent: Mar. 7, 2023

(54) METHOD AND APPARATUS FOR TRAINING TRAJECTORY CLASSIFICATION MODEL, AND ELECTRONIC DEVICE

(71) Applicant: Beijing Baidu Netcom Science and Technology Co., Ltd., Beijing (CN)

(72) Inventors: Enyang Bai, Beijing (CN); Kedi Chen, Beijing (CN); Miao Zhou, Beijing (CN); Quan Meng, Beijing (CN); Wei Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 612 days.

(21) Appl. No.: 16/710,068

(22) Filed: Dec. 11, 2019

(65) Prior Publication Data
US 2020/0334571 A1 Oct. 22, 2020

(30) Foreign Application Priority Data
Apr. 18, 2019 (CN) .......................... 201910315099.7

(51) Int. Cl.
*G06N 20/00* (2019.01)
*G06K 9/62* (2022.01)
(Continued)

(52) U.S. Cl.
CPC ............. *G06N 20/00* (2019.01); *G05D 1/021* (2013.01); *G05D 1/0212* (2013.01);
(Continued)

(58) Field of Classification Search
CPC .. G05B 13/00; G05B 13/021; G05B 13/0215; G05B 13/024; G05B 13/0255;
(Continued)

(56) References Cited

U.S. PATENT DOCUMENTS

| | | | |
|---|---|---|---|
| 8,824,777 B2 * | 9/2014 | Choi | B25J 9/1656 382/153 |
| 2011/0313957 A1 | 12/2011 | Ide et al. | |
| 2018/0374359 A1 * | 12/2018 | Li | G06N 3/04 |

FOREIGN PATENT DOCUMENTS

| | | |
|---|---|---|
| CN | 1929530 A | 3/2007 |
| CN | 105598965 A | 5/2016 |

(Continued)

OTHER PUBLICATIONS

"Machine Learning of Web Data"; Japan, Japan Enterprise Kodansha, Aug. 24, 2016; pp. 39-42; ISBN:978-4-06-152918-2, with machine translation of portion cited in Japanese Office Action dated Aug. 3, 2021 (7 pages).

*Primary Examiner* — Anthony R Jimenez
(74) *Attorney, Agent, or Firm* — Nixon Peabody LLP

(57) ABSTRACT

Embodiments of the present disclosure relate to a method for training a trajectory classification model. The method includes: acquiring trajectory data; computing a trajectory feature of the trajectory data based on a temporal feature and a spatial feature of the trajectory data, the trajectory feature comprising at least one of a curvature or a rotation angle; and training the trajectory feature to obtain the trajectory classification model. Embodiments of the present disclosure further provide an apparatus for training a trajectory classification model, an electronic device, and a computer readable medium.

20 Claims, 3 Drawing Sheets

(51) Int. Cl.
*G06T 7/20* (2017.01)
*G05D 1/02* (2020.01)

(52) U.S. Cl.
CPC ......... *G05D 1/0221* (2013.01); *G06K 9/6267* (2013.01); *G06T 7/20* (2013.01); *G06T 2207/30241* (2013.01)

(58) Field of Classification Search
CPC .............. G05B 13/0265; G05B 13/027; G05B 13/0285; G05B 13/029; G05B 13/042; G05B 19/00; G05B 19/37; B60L 2240/00; B60L 2240/62; B60L 2240/70; B60L 2260/40; B60L 2260/42; B60L 2260/46; B60L 2260/48; B60L 2260/50; B60L 2050/0089; B60L 2050/0097; B60L 2550/00; B60L 2550/14; B60L 2550/146; B60L 2550/40; B60L 2550/402; G06N 20/00; G06N 20/10; G06N 20/20; G06T 1/00; G06T 1/0007; G06T 2200/00; G06T 2200/04; G06T 2207/20081; G06T 2207/20084; G06T 7/20; G06T 2207/30241; G06K 9/6267; G05D 1/00; G05D 1/0088; G05D 1/02; G05D 1/021; G05D 1/0212; G05D 1/0221; G05D 3/00; G05D 3/12; G05D 2201/00; G05D 2201/02; G05D 2201/0207; G05D 2201/0213

See application file for complete search history.

(56) References Cited

FOREIGN PATENT DOCUMENTS

| | | | |
|---|---|---|---|
| CN | 106314438 | A | 1/2017 |
| CN | 106774312 | A | 5/2017 |
| CN | 107241697 | A * | 10/2017 |
| CN | 107705183 | A | 2/2018 |
| CN | 107714038 | A | 2/2018 |
| CN | 107766852 | A | 3/2018 |
| CN | 108788560 | A | 11/2018 |
| CN | 109034181 | A | 12/2018 |
| CN | 109299744 | A | 2/2019 |
| CN | 109634820 | A | 4/2019 |
| EP | 3462261 | A1 | 4/2019 |
| JP | 2012008659 | A | 1/2012 |
| JP | 2012123749 | A | 6/2012 |
| KR | 20160042500 | A | 4/2016 |
| KR | 2123180 | B1 | 6/2020 |
| WO | 2020159078 | A1 | 8/2020 |

\* cited by examiner

METHOD AND APPARATUS FOR TRAINING TRAJECTORY CLASSIFICATION MODEL, AND ELECTRONIC DEVICE

CROSS-REFERENCE TO RELATED APPLICATIONS

This application claims priority to Chinese Application No. 201910315099.7, filed on Apr. 18, 2019 and entitled "Method and Apparatus for Training Trajectory Classification Model, and Electronic Device," the entire disclosure of which is hereby incorporated by reference.

TECHNICAL FIELD

Embodiments of the present disclosure relate to the field of computer technology, and specifically to a method and apparatus for training a trajectory classification model, an electronic device, and a computer readable medium.

BACKGROUND

With the rapid development of intelligent electronic capturing devices, a plurality of kinds of trajectory data may be collected using devices, such as a smart phone, vehicle navigation, or a GPS. The trajectory data provide important solutions for the aspects, such as smart city, transport planning, and reasonable travel arrangement. Analysis and utilization of the trajectory data have been the focus of commercial discussions in recent years.

In the related art, e.g., behaviors of a moving target are analyzed and understood based on an image sequence captured by a camera, and an alarm is given for abnormal behaviors. Behavior detection is an important function of intelligent visual surveillance. Event detection based on the trajectory data can analyze the behaviors of the target for a long time, thus effectively predicting and determining the behaviors of the target, e.g., establishing a 4-dimensional histogram.

SUMMARY

Embodiments of the present disclosure provide a method and apparatus for training a trajectory classification model, an electronic device, and a computer readable medium.

In a first aspect, an embodiment of the present disclosure provides a method for training a trajectory classification model, including: acquiring trajectory data; computing a trajectory feature of the trajectory data based on a temporal feature and a spatial feature of the trajectory data, the trajectory feature comprising at least one of a curvature or a rotation angle; and training the trajectory feature to obtain the trajectory classification model.

In some embodiments, after the acquiring trajectory data, the method further comprises: preprocessing the trajectory data; and the computing a trajectory feature of the trajectory data based on a temporal feature and a spatial feature of the trajectory data comprises: computing the trajectory feature based on a temporal feature and a spatial feature of preprocessed trajectory data; and the preprocessing comprises: deleting trajectory data satisfying at least one condition, to obtain the preprocessed trajectory data; and the at least one condition comprises: the temporal feature being identical, but the spatial feature being different; or a number of pieces of trajectory data with a spatial feature beyond a preset regional range being less than a preset ratio.

In some embodiments, the method further comprises: computing a time interval of sampling time of the trajectory data based on the temporal feature of the trajectory data; and executing the computing a trajectory feature of the trajectory data based on a temporal feature and a spatial feature of the trajectory data, in response to each time interval being identical.

In some embodiments, the method further comprises: resampling the trajectory data at a preset time interval in accordance with a linear interpolation sampling method, in response to at least one time interval being different, to obtain resampled trajectory data; and the computing a trajectory feature of the trajectory data based on a temporal feature and a spatial feature of the trajectory data comprises: computing the trajectory feature based on a temporal feature and a spatial feature of the resampled trajectory data.

In some embodiments, the training the trajectory feature to obtain the trajectory classification model comprises: dividing the trajectory data into training data and check data; extracting a first trajectory feature corresponding to the training data; training the first trajectory feature based on a machine learning model, to obtain an initial trajectory classification model; extracting a second trajectory feature corresponding to the check data; and determining the trajectory classification model based on the initial trajectory classification model and the second trajectory feature.

In some embodiments, the determining the trajectory classification model based on the initial trajectory classification model and the second trajectory feature comprises: inputting the second trajectory feature into the initial trajectory classification model to obtain a trajectory classification result; and adjusting, in response to a difference between the trajectory classification result and a preset classification result being greater than a preset threshold, a parameter of the machine learning model, and training the first trajectory feature based on the adjusted machine learning model.

In some embodiments, the trajectory feature further comprises at least one of: velocity, acceleration, maximum velocity change, minimum velocity change, average velocity change, median velocity change, or velocity change variance.

In a second aspect, an embodiment of the present disclosure provides an apparatus for training a trajectory classification model, including: an acquiring module configured to acquire trajectory data; a computing module configured to compute a trajectory feature of the trajectory data based on a temporal feature and a spatial feature of the trajectory data, the trajectory feature including at least one of a curvature or a rotation angle; and a training module configured to train the trajectory feature to obtain the trajectory classification model.

In some embodiments, the apparatus further includes: a preprocessing module configured to preprocess the trajectory data; the computing module is configured to compute the trajectory feature based on a temporal feature and a spatial feature of preprocessed trajectory data; the preprocessing includes: deleting trajectory data satisfying at least one condition, to obtain preprocessed trajectory data; the at least one condition includes: the temporal feature being identical, but the spatial feature being different; or a number of pieces of trajectory data with a spatial feature beyond a preset regional range being less than a preset ratio.

In some embodiments, the computing module is further configured to compute a time interval of sampling time of the trajectory data based on the temporal feature of the trajectory data; execute the computing a trajectory feature of the trajectory data based on a temporal feature and a spatial feature of the trajectory data, in response to each time interval being identical.

In some embodiments, the apparatus further includes: a resampling module configured to resample the trajectory data at a preset time interval in accordance with a linear interpolation sampling method, in response to at least one time interval being different, to obtain resampled trajectory data; the computing module is configured to: compute the trajectory feature based on a temporal feature and a spatial feature of the resampled trajectory data.

In some embodiments, the training module is configured to: divide the trajectory data into training data and check data; extract a first trajectory feature corresponding to the training data; train the first trajectory feature based on a machine learning model, to obtain an initial trajectory classification model; extract a second trajectory feature corresponding to the check data; and determine the trajectory classification model based on the initial trajectory classification model and the second trajectory feature.

In some embodiments, the training module is specifically configured to: input the second trajectory feature into the initial trajectory classification model to obtain a trajectory classification result; and adjust, in response to a difference between the trajectory classification result and a preset classification result being greater than a preset threshold, a parameter of the machine learning model, and train the first trajectory feature based on the adjusted machine learning model.

The technical solutions provided in embodiments of the present disclosure acquire trajectory data, compute a trajectory feature of the trajectory data based on a temporal feature and a spatial feature of the trajectory data, the trajectory feature including at least one of a curvature or a rotation angle, and train the trajectory feature to obtain a trajectory classification model, thereby achieving establishing the trajectory classification model, and achieving the technical effects of accuracy of the trajectory classification model.

BRIEF DESCRIPTION OF THE DRAWINGS

The accompanying drawings are used for providing further understanding of embodiments of the present disclosure, constitute an integral part of the DESCRIPTION, and are used for interpreting the present disclosure together with embodiments of the present disclosure, but do not impose any limitation on the present disclosure. By describing detailed example embodiments with reference to the accompanying drawings, the above and other features and advantages of the present disclosure will become more apparent for those skilled in the art.

Figure 1:
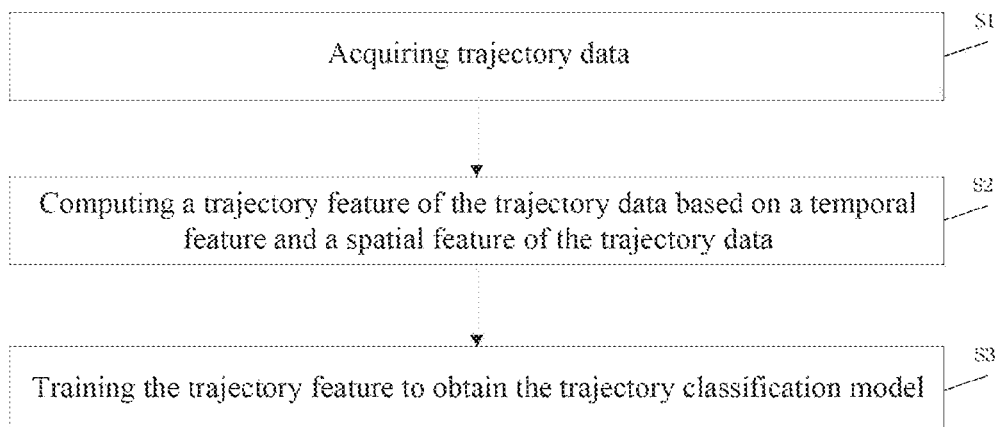
FIG. 1 is a schematic diagram of a method for training a trajectory classification model according to embodiments of the present disclosure.

1. Reference numerals in the accompanying drawings: acquiring module, 2. computing module, 3. training module, 4. preprocessing module, and 5. resampling module.

DETAILED DESCRIPTION OF EMBODIMENTS

To make those skilled in the art better understand the technical solutions of the present disclosure, the method, apparatus, electronic device, and computer readable medium for training a trajectory classification model provided in embodiments of the present disclosure will be described in detail below in conjunction with the accompanying drawings.

Example embodiments will be described more fully hereinafter with reference to the accompanying drawings; however, they may be embodied in different forms and should not be construed as limited to embodiments set forth herein. On the contrary, these embodiments are provided so that the present disclosure will be thorough and complete and will fully convey the scope of the present disclosure to those of ordinary skilled in the art.

As used herein, the term "and/or" includes any and all combinations of one or more of the associated listed items.

As used herein, the terms are intended merely to describe particular embodiments, and are not intended to limit the present disclosure. As used herein, the singular forms "a," "an," and "the" are intended to include the plural forms as well, unless the context expressly indicates otherwise. It will be further understood that the terms "includes," "comprises," "including," and/or "comprising," when used in the present specification, specify the presence of stated features, entireties, steps, operations, elements, and/or components, but do not preclude the presence or addition of one or more other features, entireties, steps, operations, elements, components, and/or groups thereof.

Embodiments described herein will refer to plan views and/or cross-sectional views by way of ideal schematic views herein may be described. Accordingly, the views may be modified depending on manufacturing technologies and/or tolerances. Therefore, embodiments are not limited to those shown in the figures, but include modifications in configuration formed on the basis of manufacturing processes. Therefore, regions exemplified in figures have schematic properties and shapes of regions shown in figures exemplify specific shapes or regions of elements, and are not intended to be limiting.

Unless otherwise defined, all terminologies (including technological and scientific terminologies) used herein have the same meanings as commonly understood by those of ordinary skilled in the art. It will be further understood that, terms, such as those defined in commonly used dictionaries, should be interpreted as having meanings that are consistent with their meanings in the context of the relevant art and the present disclosure, and will not be interpreted in an idealized or overly formal sense unless expressly defined so herein.

According to an aspect of embodiments of the present disclosure, embodiments of the present disclosure provide a method for training a trajectory classification model.

Referring to FIG. 1, FIG. 1 is a schematic diagram of a method for training a trajectory classification model of embodiments of the present disclosure.

As shown in FIG. 1, the method includes following steps.

S1: acquiring trajectory data.

The trajectory data are data information obtained by sampling motion processes of one or more moving objects in a space-time environment, including positions of sampling points, sampling time, and the like. The data information of these sampling points constitutes the trajectory data in sequence of sampling.

For example, for a smart phone having a positioning function, the trajectory data reflects action situation of a smart phone holder in a period of time. Mobile Internet may position the position of the smart phone through wireless signal to further perform sampling and record the position of the smart phone, and connect the sampling points to form motion trajectory data of the smart phone holder. A GPS positioning terminal records longitude and latitude information of the position of the terminal at a fixed sampling frequency, and collects data onto a server via a wireless network. A RFID tag technology tags an object, and completes positioning and position data recording of moving track of the object by a RFID identifier, to form a motion trajectory of the object.

S2: computing a trajectory feature of the trajectory data based on a temporal feature and a spatial feature of the trajectory data, the trajectory feature including at least one of a curvature or a rotation angle.

As can be seen from the above description of the trajectory data, the trajectory data include the sampling point position and the sampling time. The sampling point position is the spatial feature of the trajectory data. The sampling time is the temporal feature of the trajectory data.

The trajectory feature is a feature of a motion state of the moving object.

In the related art, the trajectory feature is mainly reflected as a velocity. The velocity of the moving object may be determined based on position and time of a current sampling point and position and time of a last sampling point of the moving object.

In the present embodiment, the trajectory feature includes at least one of the curvature or the rotation angle. Correlation between the temporal feature and the spatial feature is fully combined to achieve the efficiency and accuracy of subsequent training.

In some embodiments, the trajectory feature further includes: one or more of velocity, acceleration, maximum velocity change, minimum velocity change, average velocity change, median velocity change, or velocity change variance.

Specifically, the velocity has the equation of $v=\Delta s/\Delta t$. $\Delta s$ is a displacement difference determined based on the spatial feature, and $\Delta t$ is a time difference determined based on the temporal feature.

For example, the current sampling point of the moving object is t, and the last sampling point is i. The spatial feature of the sampling point t is longitude t1 and latitude t2. The spatial feature of the sampling point i is longitude i1 and latitude i2. A distance (i.e., displacement difference) the moving object moves from the sampling point t to the sampling point i is determined based on t1, t2, i1 and i2. The specific computing method may refer the related art. The description will not be repeated here.

The temporal feature of the sampling point t is a moment t3. The temporal feature of the sampling point i is a moment i3. Time (i.e., time difference) when the moving object moves from the sampling point i to the sampling point t is determined based on i3 and t3. The specific computing method may refer the related art. The description will not be repeated here.

Specifically, the acceleration has the equation of $a=\Delta v/\Delta t$. $\Delta v$ is a velocity change of the moving object moving from the sampling point i to the sampling point t.

Specifically, the rotation angle has the equation of $\theta=\arctan(|\tan\alpha-\tan\beta|)/(1+\tan\alpha\tan\beta)$. An angle $\alpha$ of the sampling point t may be determined based on the longitude and latitude of the sampling point t (for example, establishing a coordinate system by using a point with the longitude and latitude of 0 as the origin, using a connection line of the south and north poles through the origin as the vertical axis, and using a line through the origin and perpendicular to the vertical axis as the horizontal axis). An angle $\beta$ of the sampling point i is determined based on the longitude and latitude of the sampling point i.

Specifically, the curvature has the equation of $c=(d_{it}+d_{tj})/d_{ij}$. $d_{it}$ is a distance between the sampling point i and the sampling point t. $d_{tj}$ is a distance between the sampling point t and a sampling point j (the sampling point j is a next sampling point of the sampling point t). $d_{ij}$ is a distance between the sampling point i and the sampling point j.

Algorithms of other trajectory features described above will not be enumerated here.

In some embodiments, after acquiring the trajectory data, the trajectory data are first preprocessed, and then the trajectory feature is computed based on preprocessed trajectory data. That is, step S11 of preprocessing the trajectory data is further included between S1 and S2, and S2 includes corresponding processing based on the preprocessed trajectory data, and then obtaining the trajectory feature.

In the related art, after acquiring the trajectory data, the trajectory data are directly analyzed, and then a category of the moving object is further determined. In the present embodiment, the acquired data are first preprocessed, equivalent to filtering abnormal data of the trajectory data, and removing the abnormal data, and then the trajectory feature is computed based on the temporal feature and the spatial feature of normal data, thus ensuring the validity of the trajectory feature.

S11 includes: deleting trajectory data satisfying at least one condition, to obtain preprocessed trajectory data.

The at least one condition includes: (1) the temporal feature being identical, but the spatial feature being different; or (2) a number of pieces of trajectory data with a spatial feature beyond a preset regional range being less than a preset ratio.

For example, the first condition is as follows: a temporal feature of trajectory data a is identical to a temporal feature of trajectory data b, but a spatial feature of the trajectory data a is different from a spatial feature of the trajectory data b. That is, two different pieces of trajectory data are obtained at the same moment, suggesting that at least one piece of trajectory data is abnormal. To ensure the accuracy of the training, both the trajectory data a and the trajectory data b are deleted.

For example, the second condition is as follows: a thousand pieces of trajectory data are available in total, where spatial features of nine hundred and ninety-nine pieces of trajectory data are within the range of Beijing, and a spatial feature of one piece of trajectory data is within the range of Shanghai, indicating that the piece of trajectory data with the spatial feature within the range of Shanghai is abnormal, and should be deleted.

The ratio may be set based on actual requirements. For example, a thousand pieces of trajectory data are available in total, where spatial features of eight hundred pieces of trajectory data are within the range of Beijing, and spatial features of two hundred pieces of trajectory data are within the range of Tianjin. Beijing and Tianjin are adjacent cities, and the moving object moving from Beijing to Tianjin is a normal event, indicating that the trajectory data are not abnormal.

Since the abnormal trajectory data are removed through the above preprocessing, the problem of trajectory data repetition or loss caused by delay and network congestion of data reported by sensors may be eliminated. Further, the problem of inaccurate positioning caused by sensor deviations may be eliminated.

In some embodiments, before executing S2, resampling the trajectory data is further included.

Figure 2:
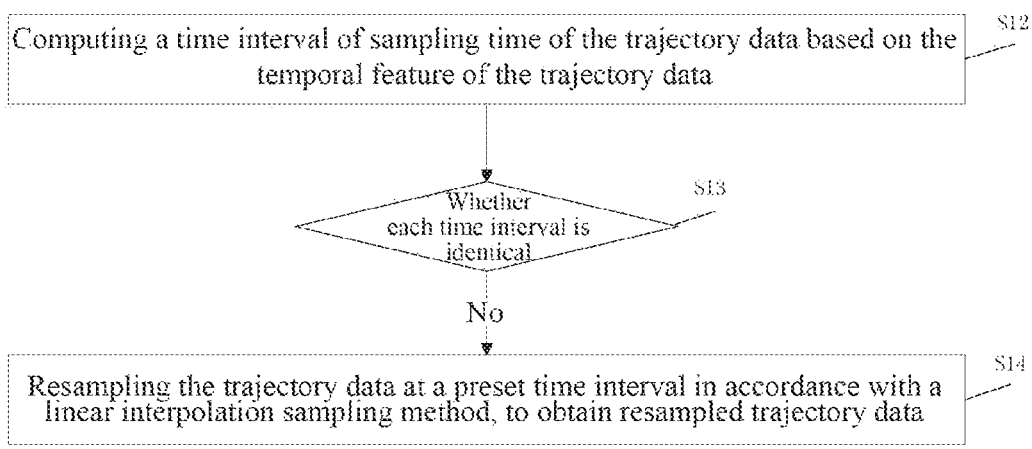
FIG. 2 is a schematic diagram of a method for resampling trajectory data according to an embodiment of the present disclosure.

Referring to FIG. 2, FIG. 2 is a schematic diagram of a method for resampling trajectory data of an embodiment of the present disclosure.

As show in FIG. 2, the method for resampling trajectory data includes following steps.

S12: computing a time interval of sampling time of the trajectory data based on the temporal feature of the trajectory data.

S13: determining whether each time interval is identical. If each time interval is identical, then S2 is executed. If each time interval is not identical, then S14 is executed.

S14: resampling the trajectory data at a preset time interval in accordance with a linear interpolation sampling method, to obtain resampled trajectory data.

Further, S2 is executed. S2 specifically includes: computing the trajectory feature based on a temporal feature and a spatial feature of the resampled trajectory data.

Due to sensor, network, or other reasons, a frequency corresponding to acquired trajectory data (i.e., the time interval of the sampling time) may be inconsistent, thereby resulting in the technical problem of inaccurate training results. Determining resampling based on the frequency and resampling the trajectory data at the preset time interval in accordance with the linear interpolation sampling method provided in the present embodiment can ensure the accuracy and consistency of the resampled trajectory data.

In some embodiments, the resampling the trajectory data at the preset time interval in accordance with the linear interpolation sampling method includes: interpolating, in accordance with spatial features and temporal features of two adjacent sampling points, at least one sampling point between the two adjacent sampling points.

In some embodiments, after S1, and before S2, S1-2 is further included: smoothing the trajectory data.

Specifically, the smoothing the trajectory data may be implemented by Kalman filter smoothing.

The smoothing the trajectory data can eliminate errors of the acquired trajectory data caused by errors of the sensor or other devices, and achieve the technological effects of denoising the acquired trajectory data and reducing the errors.

S1-2 is independent of S12 to S14. That is, in some embodiments, the smoothing may be merely included. In some embodiments, the resampling the trajectory data may be merely included. In order to ensure the accuracy and consistency of the trajectory data, in some embodiments, both the smoothing and the resampling the trajectory data may be included.

When an embodiment includes both the smoothing and the resampling the trajectory data, the resampling the trajectory data is first executed, and then the smoothing is executed, to ensure the efficiency of processing the trajectory data.

S3: training the trajectory feature to obtain the trajectory classification model.

The training process may employ an approach in the related art. For example, the trajectory feature is trained through a neural network model. This is not specifically limited here.

Figure 3:
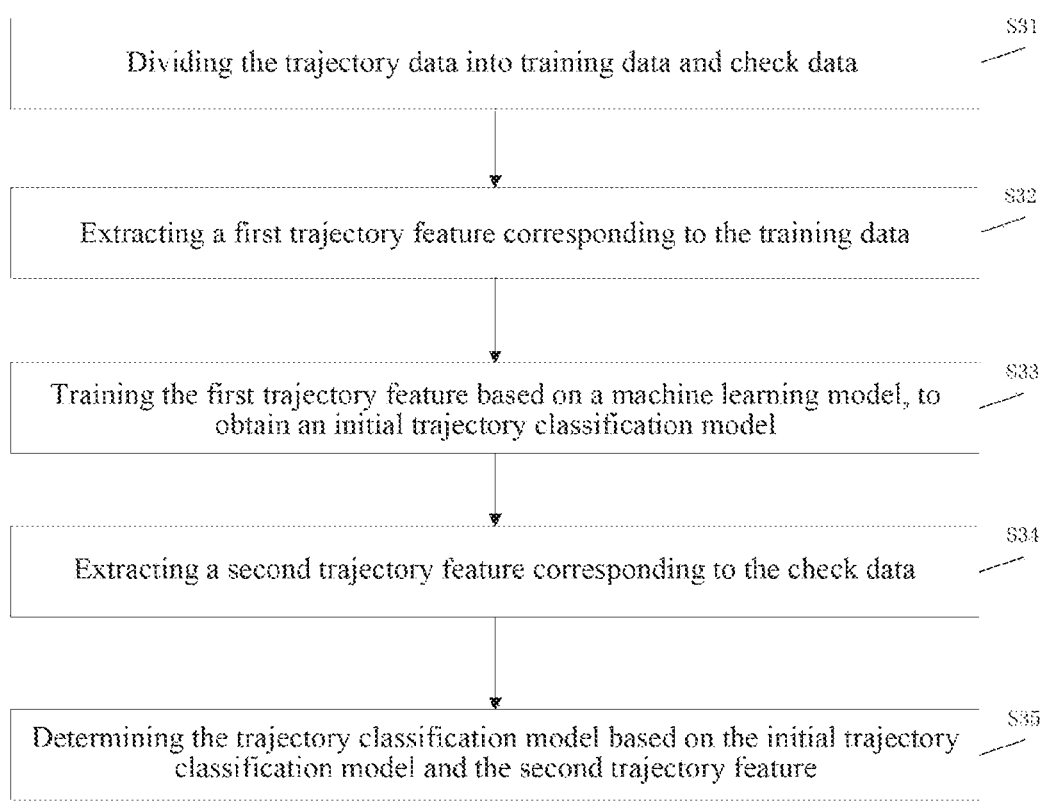
FIG. 3 is a schematic diagram of a method for training a trajectory feature according to an embodiment of the present disclosure.

As can be seen from FIG. 3, in some embodiments, S3 includes following steps.

S31: dividing the trajectory data into training data and check data.

In this step, the trajectory data are divided into two portions. One portion of the trajectory data is training data, and the other portion of the trajectory data is check data.

For example, 80% of the trajectory data are randomly selected from the trajectory data for use as the training data, and the remaining 20% of the trajectory data are used as the check data.

S32: extracting a first trajectory feature corresponding to the training data.

S33: training the first trajectory feature based on a machine learning model, to obtain an initial trajectory classification model.

The machine learning model is Python sklearn machine learning model. A gradient boost decision tree (GBDT) model for integrated learning is provided within the machine learning model.

Specifically, the initial trajectory classification model is obtained by training using the first trajectory feature as an input of the sklearn machine learning model, and using a category of the first trajectory feature as a tag of a result of the sklearn machine learning model.

S34: extracting a second trajectory feature corresponding to the check data.

S35: determining the trajectory classification model based on the initial trajectory classification model and the second trajectory feature.

In this step, the initial trajectory classification model is corrected based on the second trajectory feature, to obtain the trajectory classification model.

In the present embodiment, the initial trajectory classification model is obtained by training using the training data, and the trajectory classification model is obtained by correcting the initial trajectory classification model using the check data, thus ensuring the validity and accuracy of the trajectory classification model.

In some embodiments, S35 includes following steps.

S351: inputting the second trajectory feature into the initial trajectory classification model to obtain a trajectory classification result.

S352: adjusting, in response to a difference between the trajectory classification result and a preset classification result being greater than a preset threshold, parameters of the machine learning model, and training the first trajectory feature based on the adjusted machine learning model.

The parameters of the machine learning model include: tree depth, number, maximum number of leaf nodes, and the like. If the difference between the trajectory classification result and the preset classification result is greater than the preset threshold, then the initial trajectory classification model is less accurate, and at least one parameter of the tree depth, number, or maximum number of leaf nodes is adjusted, thus training the first trajectory feature based on the adjusted machine learning model, until the difference between the trajectory classification result and the preset classification result is less than or equal to the preset threshold.

Figure 4:
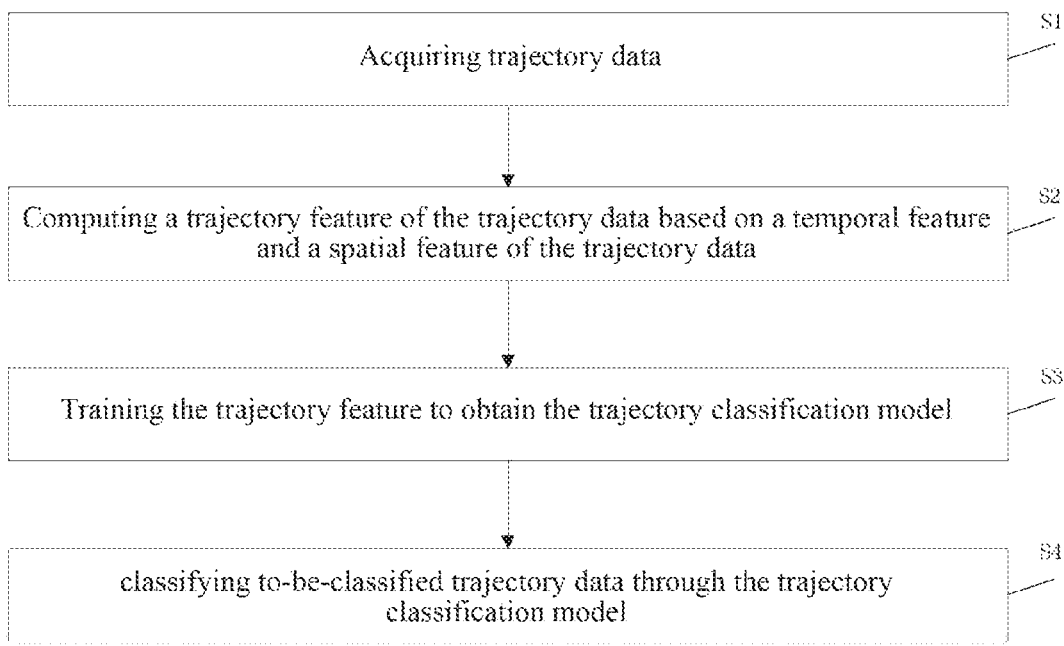
FIG. 4 is a schematic diagram of a method for training a trajectory classification model according to another embodiment of the present disclosure.

As can be seen from FIG. 4, in some embodiments, the method further includes: S4: classifying to-be-classified trajectory data through the trajectory classification model.

For example, the to-be-classified trajectory data are inputted into the trajectory classification model, and a type of the to-be-classified trajectory data, i.e., a type of a moving object, is determined based on an output result of the trajectory classification model.

According to another aspect of some embodiments of the present disclosure, some embodiments of the present disclosure further provide an apparatus for training a trajectory classification model.

Figure 5:
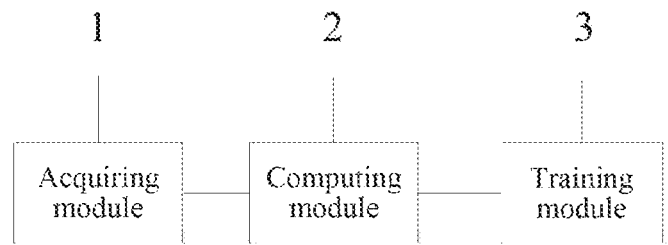
FIG. 5 is a schematic diagram of an apparatus for training a trajectory classification model according to an embodiment of the present disclosure.

Referring to FIG. 5, FIG. 5 is a schematic diagram of an apparatus for training a trajectory classification model of some embodiments of the present disclosure.

As shown in FIG. 5, the apparatus includes: an acquiring module 1 configured to acquire trajectory data; a computing module 2 configured to compute a trajectory feature of the trajectory data based on a temporal feature and a spatial feature of the trajectory data, the trajectory feature including at least one of a curvature or a rotation angle; and a training module 3 configured to train the trajectory feature to obtain the trajectory classification model.

Figure 6:
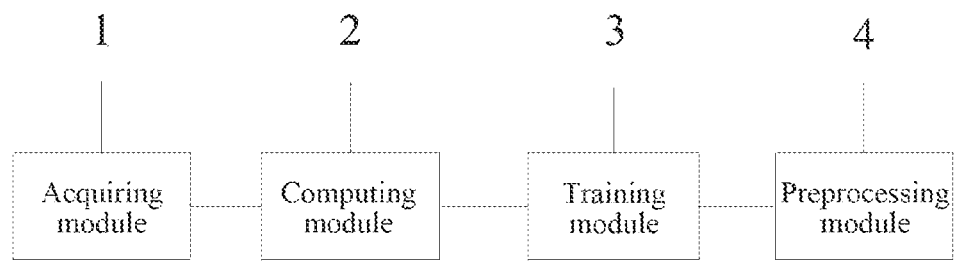
FIG. 6 is a schematic diagram of an apparatus for training a trajectory classification model according to another embodiment of the present disclosure.

As can be seen from FIG. 6, in some embodiments, the apparatus further includes: a preprocessing module 4 configured to preprocess the trajectory data.

The preprocessing includes: deleting trajectory data satisfying at least one condition, to obtain preprocessed trajectory data.

The at least one condition includes: the temporal feature being identical, but the spatial feature being different; or a number of pieces of trajectory data with a spatial feature beyond a preset regional range being less than a preset ratio.

The computing module 2 is specifically configured to compute the trajectory feature based on a temporal feature and a spatial feature of preprocessed trajectory data.

In some embodiments, the computing module 2 is further configured to compute a time interval of sampling time of the trajectory data based on the temporal feature of the trajectory data.

The computing module 2 is configured to execute the computing a trajectory feature of the trajectory data based on a temporal feature and a spatial feature of the trajectory data, in response to each time interval being identical.

Figure 7:
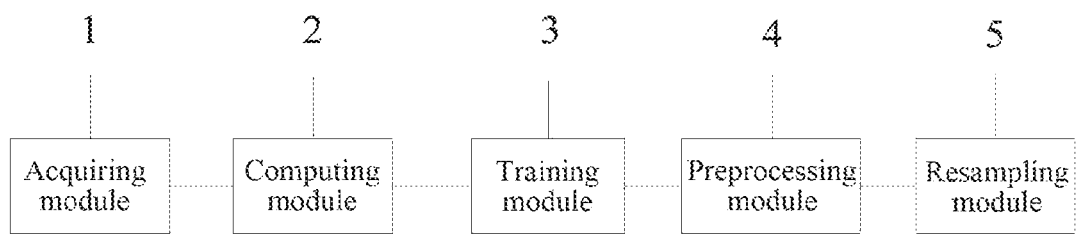
FIG. 7 is a schematic diagram of an apparatus for training a trajectory classification model according to another embodiment of the present disclosure.

As can be seen from FIG. 7, in some embodiments, the apparatus further includes: a resampling module 5 configured to resample the trajectory data at a preset time interval in accordance with a linear interpolation sampling method, in response to at least one time interval being different, to obtain resampled trajectory data.

The computing module 2 is specifically configured to: compute the trajectory feature based on a temporal feature and a spatial feature of the resampled trajectory data.

In some embodiments, the training module 3 is specifically configured to: divide the trajectory data into training data and check data; extract a first trajectory feature corresponding to the training data; train the first trajectory feature based on a machine learning model, to obtain an initial trajectory classification model; extract a second trajectory feature corresponding to the check data; and determine the trajectory classification model based on the initial trajectory classification model and the second trajectory feature.

In some embodiments, the training module 3 is specifically configured to: input the second trajectory feature into the initial trajectory classification model to obtain a trajectory classification result; and adjust, in response to a difference between the trajectory classification result and a preset classification result being greater than a preset threshold, a parameter of the machine learning model, and train the first trajectory feature based on the adjusted machine learning model.

In some embodiments, the trajectory feature further includes: one or more of velocity, acceleration, maximum velocity change, minimum velocity change, average velocity change, median velocity change, or velocity change variance.

As will be appreciated by those of ordinary skilled in the art, all or some functional blocks/units of the steps, system, and apparatus of the method disclosed above may be implemented as software, firmware, hardware, and appropriate combinations thereof. In a hardware embodiment, the division between the functional blocks/units mentioned in the above description does not necessarily correspond to division of the physical components. For example, a physical component may have a plurality of functions, or a function or step may be executed by a number of physical components cooperatively. Some or all of the physical components of the physical components may be implemented as software executed by a processor, such as a central processor, digital signal processor or microprocessor, or be implemented as hardware, or be implemented as an integrated circuit, such as an ASIC. Such software may be distributed on a computer readable medium. The computer readable medium may include a computer storage medium (or a non-transitory medium) and a communication medium (or a transitory medium). As is well known to those of ordinary skills in the art, the term "computer storage medium" includes a volatile/non-volatile, removable/non-removable medium implemented in any method or technology for storing information (such as computer readable instructions, data structures, program modules or other data). The computer storage medium includes, but is not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other medium that may be used to store desired information and may be accessed by a computer. Furthermore, as is well known to those of ordinary skills in the art, the communication medium generally contains computer readable instructions, data structures, program modules or other data in modulated data signals such a carrier wave or other transport mechanisms, and may include any information delivery medium.

Example embodiments have been disclosed herein, and although specific terms are employed, they are used and are to be interpreted in a generic and descriptive sense only and not for purpose of limitation. In some instances, as would be apparent to one of skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skills in the art that various changes in form and details may be made without departing from the scope of the present disclosure as set forth in the appended claims.

What is claimed is:

1. A method for training a trajectory classification model, comprising:
  acquiring trajectory data;

preprocessing the trajectory data, wherein the preprocessing comprises deleting trajectory data satisfying at least one condition, to obtain preprocessed trajectory data, and the at least one condition comprises: a first condition that temporal features of first pieces of trajectory data are identical, but spatial features of the first pieces of trajectory data are different from each other; or a second condition that a number of second pieces of trajectory data is smaller than a preset value, and each of the second pieces of trajectory data comprises a spatial feature beyond a geographical range;

computing a trajectory feature of the trajectory data based on a temporal feature and a spatial feature of the preprocessed trajectory data, the trajectory feature comprising at least one of a curvature or a rotation angle; and training the trajectory feature to obtain the trajectory classification model.

2. The method according to claim 1, wherein
the at least one condition comprises: the second condition that the number of second pieces of trajectory data is smaller than the preset value, and each of the second pieces of trajectory data comprises the spatial feature beyond the geographical range.

3. The method according to claim 1, wherein the trajectory feature further comprises at least one of:
velocity, acceleration, maximum velocity change, minimum velocity change, average velocity change, median velocity change, or velocity change variance.

4. The method according to claim 1, wherein the at least one condition comprises the first condition that the temporal features of the first pieces of trajectory data are identical, but the spatial features of the first pieces of trajectory data are different from each other.

5. The method according to claim 1, wherein the method further comprises:
computing a time interval of sampling time of the trajectory data based on the temporal feature of the trajectory data; and
executing the computing a trajectory feature of the trajectory data based on a temporal feature and a spatial feature of the trajectory data, in response to each time interval being identical.

6. The method according to claim 5, wherein the method further comprises:
resampling the trajectory data at a preset time interval in accordance with a linear interpolation sampling method, in response to at least one time interval being different, to obtain resampled trajectory data; and
the computing a trajectory feature of the trajectory data based on a temporal feature and a spatial feature of the trajectory data comprises:
computing the trajectory feature based on a temporal feature and a spatial feature of the resampled trajectory data.

7. The method according to claim 1, wherein the training the trajectory feature to obtain the trajectory classification model comprises:
dividing the trajectory data into training data and check data;
extracting a first trajectory feature corresponding to the training data;
training the first trajectory feature based on a machine learning model, to obtain an initial trajectory classification model;
extracting a second trajectory feature corresponding to the check data; and determining the trajectory classification model based on the initial trajectory classification model and the second trajectory feature.

8. The method according to claim 7, wherein the determining the trajectory classification model based on the initial trajectory classification model and the second trajectory feature comprises:
inputting the second trajectory feature into the initial trajectory classification model to obtain a trajectory classification result; and
adjusting, in response to a difference between the trajectory classification result and a preset classification result being greater than a preset threshold, a parameter of the machine learning model, and training the first trajectory feature based on the adjusted machine learning model.

9. An apparatus for training a trajectory classification model, comprising:
at least one processor; and
a non-transitory computer-readable memory storing instructions, the instructions when executed by the at least one processor, cause the at least one processor to perform operations, the operations comprising:
acquiring trajectory data;
preprocessing the trajectory data, wherein the preprocessing comprises deleting trajectory data satisfying at least one condition, to obtain preprocessed trajectory data, and the at least one condition comprises: a first condition that temporal features of first pieces of trajectory data are identical, but spatial features of the first pieces of trajectory data are different from each other; or a second condition that a number of second pieces of trajectory data is smaller than a preset value, and each of the second pieces of trajectory data comprises a spatial feature beyond a geographical range;
computing a trajectory feature of the trajectory data based on a temporal feature and a spatial feature of the preprocessed trajectory data, the trajectory feature comprising at least one of a curvature or a rotation angle; and
training the trajectory feature to obtain the trajectory classification model.

10. The apparatus according to claim 9, wherein
the at least one condition comprises: the second condition that the number of second pieces of trajectory data is smaller than the preset value, and each of the second pieces of trajectory data comprises the spatial feature beyond the geographical range.

11. The apparatus according to claim 9, wherein the operations further comprise:
computing a time interval of sampling time of the trajectory data based on the temporal feature of the trajectory data; and
executing the computing a trajectory feature of the trajectory data based on a temporal feature and a spatial feature of the trajectory data, in response to each time interval being identical.

12. The apparatus according to claim 9, wherein the operations further comprise:
resampling the trajectory data at a preset time interval in accordance with a linear interpolation sampling method, in response to at least one time interval being different, to obtain resampled trajectory data; and
the computing a trajectory feature of the trajectory data based on a temporal feature and a spatial feature of the trajectory data comprises:

computing the trajectory feature based on a temporal feature and a spatial feature of the resampled trajectory data.

13. The apparatus according to claim 9, wherein the training the trajectory feature to obtain the trajectory classification model comprises:
dividing the trajectory data into training data and check data;
extracting a first trajectory feature corresponding to the training data;
training the first trajectory feature based on a machine learning model, to obtain an initial trajectory classification model;
extracting a second trajectory feature corresponding to the check data; and
determining the trajectory classification model based on the initial trajectory classification model and the second trajectory feature.

14. The apparatus according to claim 13, wherein the determining the trajectory classification model based on the initial trajectory classification model and the second trajectory feature comprises:
inputting the second trajectory feature into the initial trajectory classification model to obtain a trajectory classification result; and
adjusting, in response to a difference between the trajectory classification result and a preset classification result being greater than a preset threshold, a parameter of the machine learning model, and train the first trajectory feature based on the adjusted machine learning model.

15. A non-transitory computer readable medium, storing a computer program thereon, wherein the computer program, when executed by a processor, causes the processor to perform operations, the operations comprising:
acquiring trajectory data;
preprocessing the trajectory data, wherein the preprocessing comprises deleting trajectory data satisfying at least one condition, to obtain preprocessed trajectory data, and the at least one condition comprises: a first condition that temporal features of first pieces of trajectory data are identical, but spatial features of the first pieces of trajectory data are different from each other; or a second condition that a number of second pieces of trajectory data is smaller than a preset value, and each of the second pieces of trajectory data comprises a spatial feature beyond a geographical range;
computing a trajectory feature of the trajectory data based on a temporal feature and a spatial feature of the preprocessed trajectory data, the trajectory feature comprising at least one of a curvature or a rotation angle; and
training the trajectory feature to obtain the trajectory classification model.

16. The non-transitory computer readable medium according to claim 15, wherein
the at least one condition comprises: the second condition that the number of second pieces of trajectory data is smaller than the preset value, and each of the second pieces of trajectory data comprises the spatial feature beyond the geographical range.

17. The non-transitory computer readable medium according to claim 15, wherein the operations further comprise:
computing a time interval of sampling time of the trajectory data based on the temporal feature of the trajectory data; and
executing the computing a trajectory feature of the trajectory data based on a temporal feature and a spatial feature of the trajectory data, in response to each time interval being identical.

18. The non-transitory computer readable medium according to claim 15, wherein the operations further comprise:
resampling the trajectory data at a preset time interval in accordance with a linear interpolation sampling method, in response to at least one time interval being different, to obtain resampled trajectory data; and
the computing a trajectory feature of the trajectory data based on a temporal feature and a spatial feature of the trajectory data comprises:
computing the trajectory feature based on a temporal feature and a spatial feature of the resampled trajectory data.

19. The non-transitory computer readable medium according to claim 15, wherein the training the trajectory feature to obtain the trajectory classification model comprises:
dividing the trajectory data into training data and check data;
extracting a first trajectory feature corresponding to the training data;
training the first trajectory feature based on a machine learning model, to obtain an initial trajectory classification model;
extracting a second trajectory feature corresponding to the check data; and
determining the trajectory classification model based on the initial trajectory classification model and the second trajectory feature.

20. The non-transitory computer readable medium according to claim 19, wherein the determining the trajectory classification model based on the initial trajectory classification model and the second trajectory feature comprises:
inputting the second trajectory feature into the initial trajectory classification model to obtain a trajectory classification result; and
adjusting, in response to a difference between the trajectory classification result and a preset classification result being greater than a preset threshold, a parameter of the machine learning model, and train the first trajectory feature based on the adjusted machine learning model.

* * * * *